United States Patent [19]
Tavernetti et al.

[11] Patent Number: 5,729,143
[45] Date of Patent: Mar. 17, 1998

[54] METAL DETECTOR WITH NULLING OF IMBALANCE

[75] Inventors: Russell E. Tavernetti, San Carlos; Paul W. Dodd, San Jose, both of Calif.

[73] Assignee: Zircon Corporation, Campbell, Calif.

[21] Appl. No.: 657,343

[22] Filed: Jun. 3, 1996

[51] Int. Cl.[6] .............................. G01V 3/08; G01V 3/10; G01N 33/12; G01R 27/72
[52] U.S. Cl. ...................... 324/329; 324/233; 324/225
[58] Field of Search .............................. 324/326, 327, 324/328, 329, 233, 225

[56] References Cited

U.S. PATENT DOCUMENTS

| | | | |
|---|---|---|---|
| 4,030,026 | 6/1977 | Payne | 324/329 |
| 4,423,377 | 12/1983 | Podhrosky | 324/329 |
| 4,628,265 | 12/1986 | Johnson et al. | 324/225 |
| 4,783,630 | 11/1988 | Shoemaker | 324/329 |
| 4,868,910 | 9/1989 | Maulding | 324/329 |
| 4,894,618 | 1/1990 | Candy | 324/329 |
| 5,247,257 | 9/1993 | Chulick | 324/328 |
| 5,506,506 | 4/1996 | Candy | 324/329 |

*Primary Examiner*—Walter E. Snow
*Attorney, Agent, or Firm*—Skjerven, Morrill, MacPherson, Franklin & Friel; Norman R. Klivans

[57] ABSTRACT

A metal detector includes a receive coil and a transmit coil connected in an inductive bridge. To overcome imbalances in the bridge due for instance to misalignment of the coils or the presence of mineralization in the medium which is being examined, the metal detector automatically produces a nulling (bucking) signal to cancel out the effects of any unwanted receive coil signals detected during calibration. This nulling signal is a nulling current both in terms of level and phase, and its level and phase are determined during a calibration process prior to actual metal detection. By inclusion in the metal detector of a microprocessor (microcontroller) operating at a much higher frequency than the variations in the magnetic field used to detect metal, the nulling signal generation is performed with a high degree of time resolution, resulting a precision metal detector which adaptively ignores any unwanted signals.

14 Claims, 5 Drawing Sheets

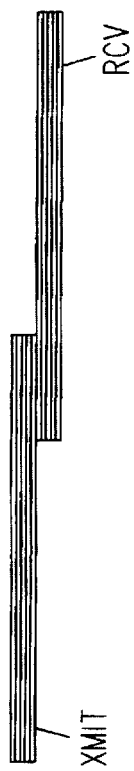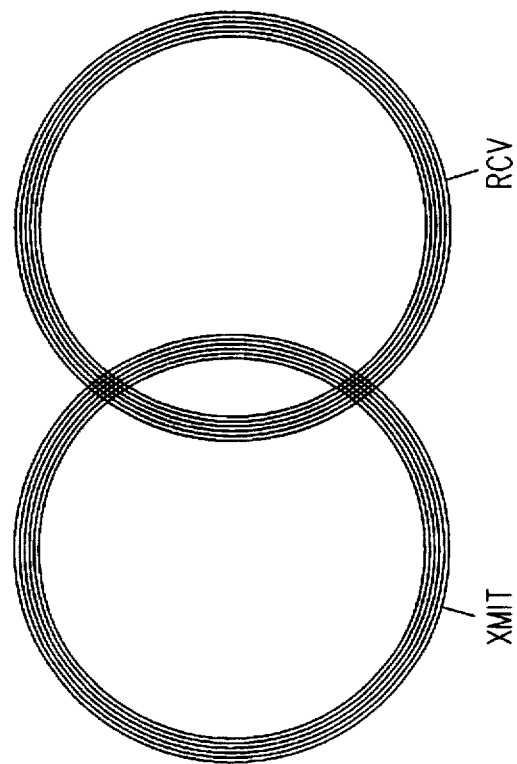
FIG. 1B
FIG. 1A

METAL DETECTOR WITH NULLING OF IMBALANCE

BACKGROUND OF THE INVENTION

1. Field of the Invention

This invention relates to metal detectors and more specifically to a metal detector having a microprocessor controlled nulling function to improve its discrimination capabilities.

2. Description of the Prior Art

Metal detectors are well known; see e.g. U.S. Pat. No. 4,868,910 issued Sep. 19, 1989, to Maulding, directed to a metal detector with microprocessor control and analysis. Maulding discusses two well known problems in metal detectors: false target signals caused by passing the detector over a mineralized ground or mineralized material in which the metal may be found, and target signals caused by undesirable targets. A well known type of metal detector as disclosed by Maulding is an induction balanced metal detector which detects variations in the magnetic field surrounding the search head, responding to all metals, i.e. ferrous and non-ferrous metals. Some metal detectors also allow the user to discriminate between ferrous and non-ferrous metals. It is also well known to use variable discrimination, providing a target signal when the detected object produces a signal having a phase that exceeds the user set value, thus allowing detection of certain types of objects to the exclusion of others. Maulding discloses a metal detector in which a ground exclusion balancing routine is automated by use of a microprocessor, thus allowing the metal detector to be balanced to ignore the effects of ground mineralization.

As is well known most metal detectors use two coils. The first coil is the transmit (or transmitter) coil which generates an alternating current (periodically varying) magnetic field directed into the search area. The second coil is a receive (or receiver) coil which is positioned in a "null" location with respect to the transmit coil and slightly spaced apart from (or in some cases overlapping) the transmit coil. The two coils are typically held by a support, i.e. potted in an adhesive material and held in a housing of the metal detector.

This coil arrangement is called an inductive bridge because when there are no nearby metal objects (the bridge is balanced), the output signal of the receive coil has zero amplitude. If a metal object (target) is bought within detection range of the receive coil, this balanced bridge is upset and a signal appears at the receive coil output terminal. This imbalance can be caused by an inductive component due to presence of a ferrous metal or a conductive component due to presence of a non-ferrous metal object. Either of these components causes the signal at the receive coil, which is also a periodic (time-varying) signal, to be phase shifted from the phase angle of the transmit coil magnetic field. The phase shifting is in opposite directions depending on whether the metal object is ferrous or non-ferrous.

The problem of discriminating between ferrous and non-ferrous metal objects is discussed in Candy, U.S. Pat. No. 5,506,506 issued Apr. 9, 1996. (Both U.S. Pat. Nos. 5,506,506 and 4,868,910 are incorporated herein by reference.)

A well known problem is that the receive coil is influenced by the strong magnetic field generated by the transmit coil. In an optimal (perfectly balanced) metal detector, the receive coil responds only to magnetic fields produced by an imbalance caused by presence of a nearby metal target. Another common problem with this type of balanced system is that it responds to small differences in the surrounding medium, such as mineralization of the ground in the case of a metal detector used for finding in-ground objects or mineralization of concrete for a metal detector used to detect metal objects buried in a concrete floor or wall. Prior art metal detectors typically address these problems by requiring manual electronic adjustments at each use, or even more frequently. Often several different such adjustments must be made.

Therefore it would be desirable to have a metal detector which is both economical to manufacture and overcomes the imbalance problems caused by the transmit coil magnetic field and mineralization of the medium in which the metal targets are present, without the prior art manual adjustments.

SUMMARY

In accordance with the present invention, a metal detector detects both ferrous and non-ferrous metals. It uses the above-described combination of a transmit coil providing a periodically varying magnetic field and a receive coil connected thereto in an inductive bridge. The detector advantageously ignores unwanted ("false") signals generated for instance by mineralization of the surrounding medium and also properly balances the two coils automatically and electronically, thereby compensating for any initial coil misalignments or any other unwanted signal offsets. Any such undesirable effects on the detector are adaptively canceled, for instance when the detector is powered up.

By use of a high speed (compared to the AC signal frequency of the magnetic field) microcontroller (microprocessor), the phase measurement and generation of a nulling signal are performed with a high degree of timing resolution. This provides a precision detector which easily ignores false signals. With the present automatic nulling method, not only are any initial coil misalignments or imbalances due to mineralization of the surrounding medium adaptively canceled, in addition the overall sensitivity of the detector is improved by balancing the receive and transmit coils in the no signal (no metal present) condition. This is performed advantageously quickly and automatically, eliminating the need for any manual adjustments. Thus less care may be taken in aligning the coils during manufacture, because the automatic nulling overcomes any leakage of the magnetic field generated by the transmit coil to the receive coil. This reduces manufacturing cost.

In accordance with the present invention therefore an oscillating electrical signal is provided to the transmit coil from the microprocessor. The frequency of this oscillating signal is equal to the resonant frequency of the combination of the transmit coil and an associated capacitor connected across the transmit coil. The receive coil similarly has a capacitor connected across it and provides its amplified output signal, to a sampling switch, i.e. a transistor. The sampling switch, controlled by the microprocessor, samples the output signal from the receive coil in synchronization with the oscillating signal which drives the transmit coil. The sampled signal from the sampling switch is provided to each of two parallel connected amplifiers to determine a range of the amplitude of the receive coil output signal. The two amplifiers increase the dynamic range of the detector and need not be present. The output signals from each of the amplifiers are coupled to the microprocessor which converts these signals to digital form for further processing. Hence the output signals of both amplifiers are monitored by a software program resident in the microprocessor which determines which amplifier is in the linear range and thus determines how to appropriately drive a display connected to the microprocessor to indicate the presence/absence of a metal object.

The microprocessor also provides a synchronous nulling signal to the receive coil, to cancel out the effects of any unwanted signals. The output signals of the two amplifiers are monitored while the sampling signal position (phase) is swept in time by the microprocessor relative to the phase of the signal driving the transmit coil to find a zero crossing (zero amplitude) of the signal from the receive coil. This determines a zero phase point of the output signal from the receive coil.

At this time a 180° phase angle shifted signal (relative to the phase angle at the zero phase point) is generated by the microprocessor and applied by the microprocessor to a multiplier (transconductance amplifier), the output terminal of which is coupled to the receive coil, at the same time the sampling pulse is phase shifted 90° (relative to the zero phase point) to be located at a peak amplitude position of the receive coil signal.

A voltage controlled gain signal is also provided to the multiplier, controlled by a pulse width modulated signal output from the microprocessor. Hence, by monitoring the output signals of the two amplifiers, the microprocessor adjusts the pulse width modulation signal which in turn varies the level of the nulling signal coupled to the receive coil. Thus, any imbalance in phase or amplitude in the inductive bridge is nulled.

BRIEF DESCRIPTION OF THE DRAWINGS

FIG. 1A shows in a plan view an arrangement of a transmit coil and a receive coil for a metal detector in accordance with this invention; FIG. 1B shows a side view of the transit and receive coils.

DETAILED DESCRIPTION

FIG. 1A shows a view of the transmit coil (XMIT) and receive coil (RCV) in accordance with this invention. These two coils are shown in a balanced relationship, and one is located over the other as shown in a side view in FIG. 1B; they are not intertwined. The conventional leads connected to each coil are not shown, nor is the conventional supporting structure which is described above. Each of the coils RCV and XMIT has a coil diameter of e.g. two inches and consists of approximately 150 turns of conventional insulated coil wire; this is not limiting. Other coil arrangements may also be used in accordance with this invention.

In one embodiment of the invention, both the coils RCV and XMIT are located in their own housing which is rigidly attached directly to the main metal detector housing for the electronics and display. This minimizes any effect of handling the instrument on the coil alignment. This close proximity between the coils and the electronics is unusual in metal detectors, and is possible here because the adaptive automatic calibration on power up prevents the electronics or user handling from disturbing the coils or their alignment.

Figure 2:
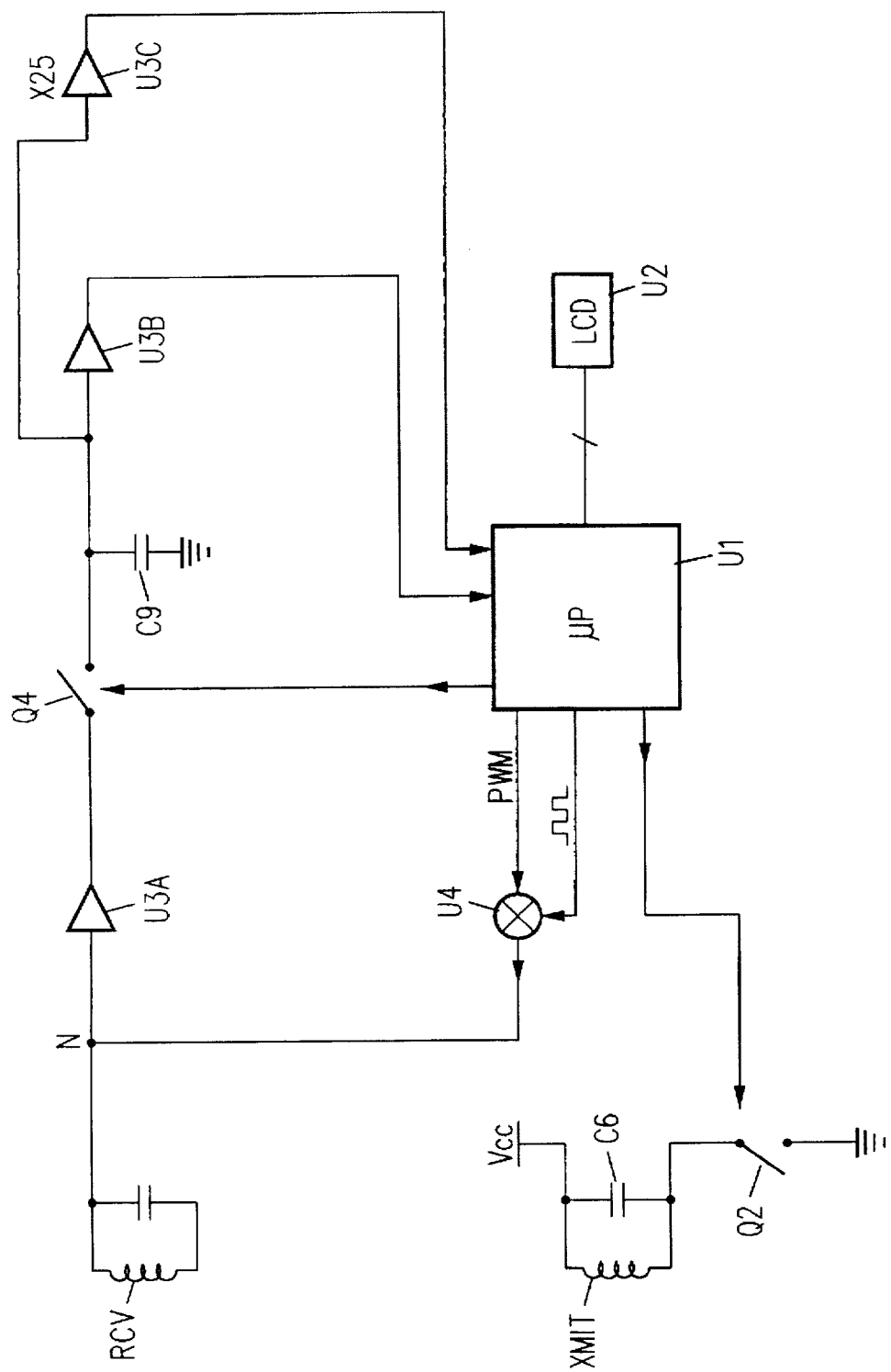
FIG. 2 shows diagrammatically a metal detector in accordance with this invention.
Figures 1, 3A:
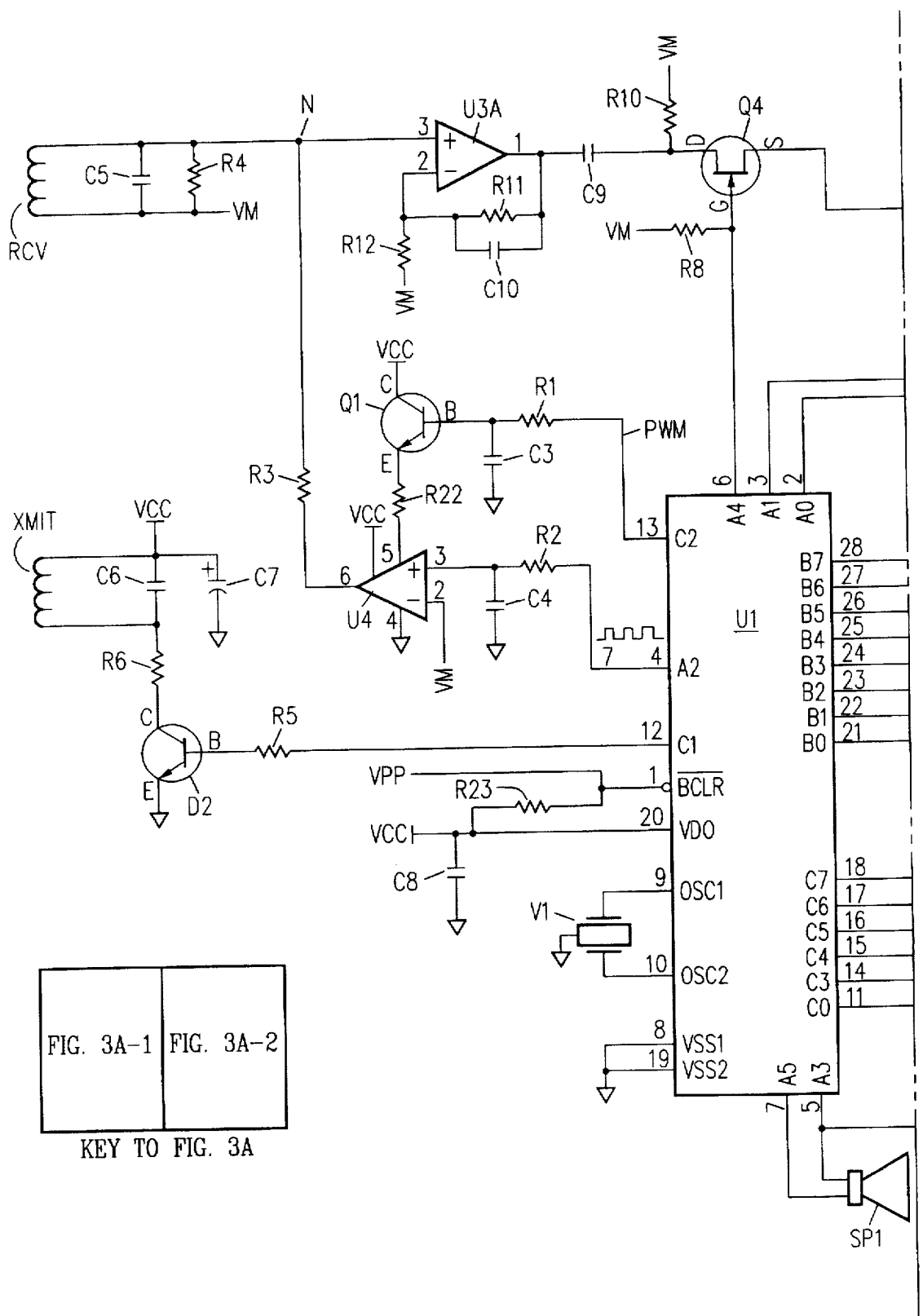
FIG. 3A shows a detailed schematic corresponding to the metal detector of FIG. 2.
Figures 2, 3A:
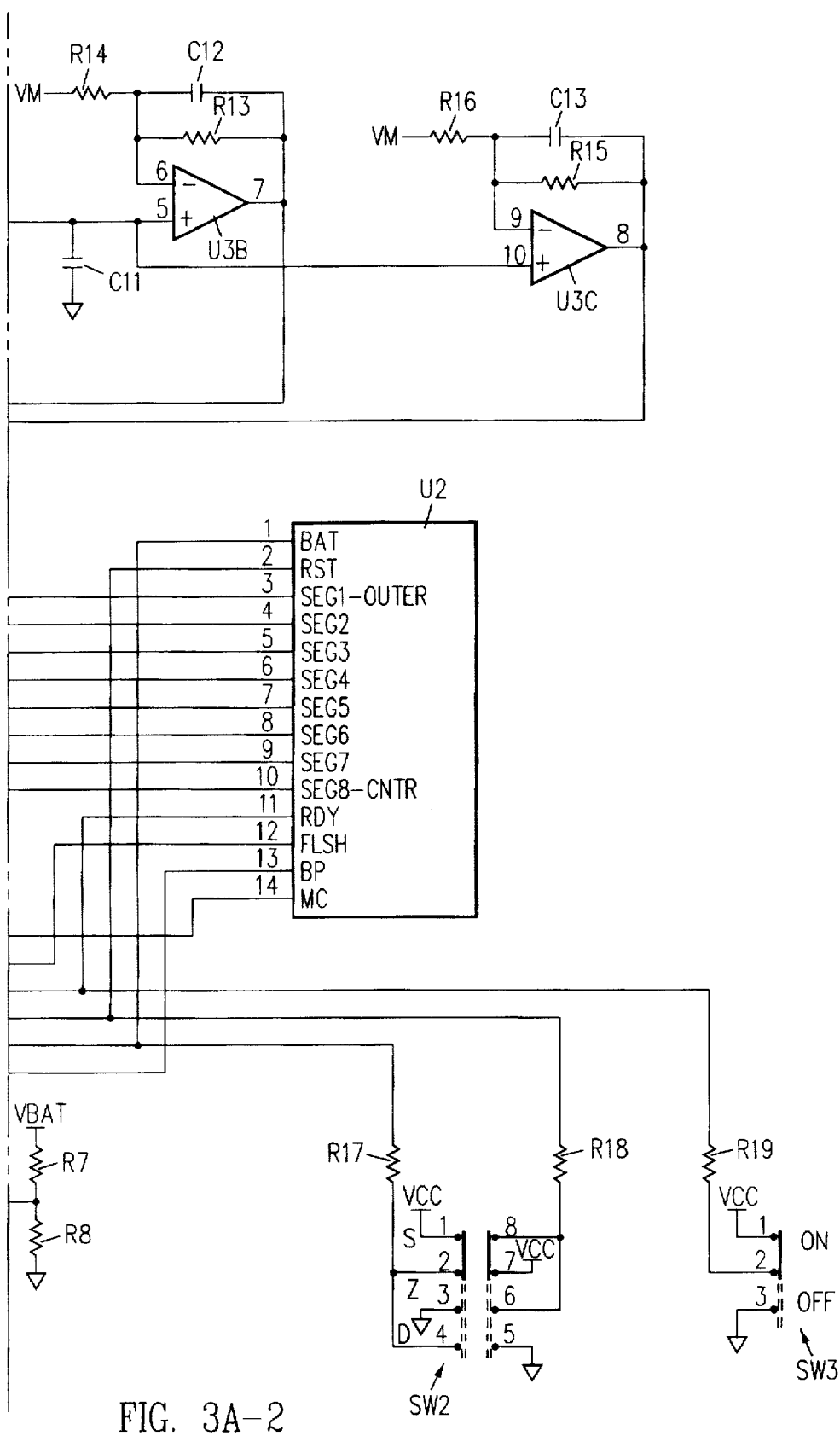
Figure 3C:
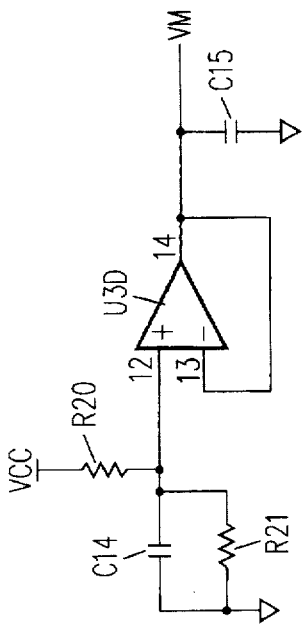
FIGS. 3B and 3C show portions of the power supply for the metal detector of FIG. 3A.
Figure 3B:
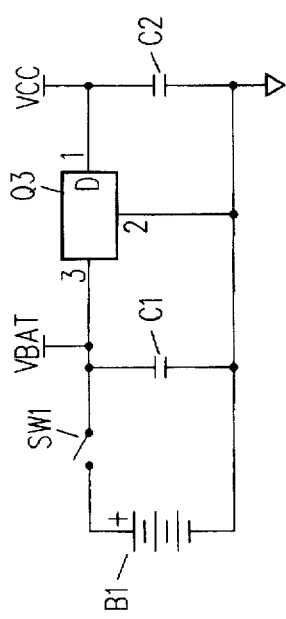

FIG. 2 is a diagram of a metal detector in accordance with this invention. It is to be understood that FIG. 1 depicts in one embodiment the actual physical relationship between the two coils XMIT and RCV of FIG. 2. FIG. 2 is for purposes of explanation; a complete schematic is shown in FIGS. 3A, 3B and 3C corresponding to FIG. 2 and the reference numbers used in FIGS. 1, 2, and 3A to 3C are such that similar reference numbers refer to similar or identical elements. In the metal detector of FIG. 2, the transmit coil XMIT has connected across its terminals a capacitor C6. Transmit coil XMIT is excited by periodic pulses output by the microprocessor U1 transmitted along the conductor connected to the control terminal of switch element Q2. Hence switch Q2 provides an output signal which is a series of pulses which drives the transmit coil XMIT, so as to create a sinusoidally varying magnetic field in the vicinity of coil XMIT. The voltage source for the transmit coil XMIT is $V_{CC}$.

If a metal object is brought within the area of the coils RCV, XMIT, the balanced bridge which includes two coils RCV, XMIT becomes imbalanced and a signal appears at the output terminal of the receive coil RCV. The receive coil RCV has connected across its terminals a capacitor C5, so coil RCV resonates at a frequency equal to the resonant frequency of coil XMIT and capacitor C6. As described above, the imbalance can be caused by different factors such as an inductive component due to the presence of a ferrous metal target or a conductive component due to a non-ferrous metal target. Either of these factors causes the signal output by the receive coil RCV, and input to AC gain amplifier U3A, to be phase shifted or amplitude modulated from the phase angle of the exciting signal (the periodic pulses) input to the base of switch Q2 and which drives the transmitter coil XMIT. This phase shifting is used conventionally to distinguish between ferrous and non-ferrous metal targets and to determine the target location; the direction of the phase shift indicates a ferrous or non-ferrous target, and its amount is indicative of the target location/size.

The amplified signal output by the AC gain amplifier U3A is supplied to a first terminal of a switch Q4 which functions as a sampling switch. Switch Q4 is controlled by a signal coupled to its control terminal, which is output from the microprocessor U1. In normal (metal detecting) operation this signal is phase locked, i.e. has the same frequency and phase, as the signal output by the receive coil RCV. Hence the sampling is normally in phase and synchronous with the excitation of the transmit coil XMIT. Operation of the sampling switch Q4 therefore allows sampling of the signal output by the receive coil RCV. The output signal from the second terminal of switch Q4 is coupled via integrating capacitor C9 to each of two parallel-connected amplifiers U3B and U3C. These two amplifiers are configured (see FIG. 3A) so that one has a low gain and the other has a high gain (e.g. 25 times the gain of the other) to accommodate a wide dynamic range of signals. Of course in other embodiments only a single such amplifier, or no such amplifiers, are provided. In this case the dynamic range of the detectable signals is less.

The output signals of each of amplifiers U3B and U3C are each coupled to analog to digital input terminals of the microprocessor U1. Hence the microprocessor (microcontroller) U1 monitors (digitally) the amplitude of the signals output by the RCV coil, and also determines which amplifier U3B, U3C is in the linear range and thus determines how to appropriately drive the display which is a liquid crystal display U2 driven by the microprocessor U1.

In accordance with this invention the nulling (bucking) signal is coupled at node N to the receive coil RCV to cancel out the effects of any unwanted elements in the signal output by the receive coil RCV. The source of these unwanted elements is, as described above, variously misalignment of the two coils RCV, XMIT during assembly, mineralization (presence of metals) in the medium surrounding the metal target, or any other sources of imbalance. As is well known, both when one is detecting metal objects buried in the ground or metal objects in concrete, there is frequently mineralization in the ground or the concrete which creates the false indication of presence of a metal object. It is also frequently the case that during manufacture the receive and transmit coils are not perfectly aligned, causing undesirable coupling of the magnetic field generated by the transmit coil to be received by the receive coil. This is especially problematic in the case of a low cost unit where it is not possible to carefully align the two coils to prevent leakage of the magnetic field from the transmit coil to the receive coil. Indeed, advantageously in accordance with this invention the metal detector can be assembled with only slight mechanical alignment of coils XMIT, RCV, eliminating the usual manual electronic adjustment during use.

Hence the microprocessor U1 generates the nulling signal as a digital (voltage level) square wave signal filtered and coupled to the input terminal of multiplier U4 which is e.g. a transconductance amplifier. Multiplier U4 converts this nulling signal to a particular current level by multiplying the filtered square wave signal (as depicted) by a PWM (pulse wide modulation) signal, the result of which is coupled to the node N. The level and phase of this varying (AC) current coupled to node N are such that it cancels out any unwanted components present in the output signal from the receive coil RCV due for instance to coil misalignment or medium mineralization. This nulling signal, i.e. cancellation current, is typically set when the metal detector is powered up during an automatic calibration process. As described below, this automatic calibration may also be used at other times, depending on the mode of operation of the device. Hence with the properly generated nulling signal, and in the absence of a metal target, there is zero signal present at node N, indicating the absence of any metal target during normal operation. On the other hand when a metal target is present, the amplitude and phase of the signal at node N is an indication of the target, in terms of its type of metal and its location, as described further below.

Hence in accordance with this invention the microprocessor U1 sets the phase and level of the nulling signal, as described hereinafter. It is to be understood that this process, as well as the above described functions of the microprocessor U1, are carried out by a conventional program (software) resident in read only memory which is a part of the microprocessor U1. One of ordinary skill in the art, given this description, would be able to write such software which may take a variety of forms.

Additionally, in other embodiments, the processing is instead carried out by "hardwired" logic circuitry. However, given the complexity of these operations, such an embodiment would be less economical than is the microprocessor embodiment.

The nulling signal generation is as follows. The microprocessor U1 receives the output signals from the two amplifiers U3B and U3C at analog to digital input terminals (ports) of the microprocessor U1. Each of these analog signals is converted by microprocessor U1 to a digital signal. At any one time the microprocessor U1 selects one of the output signals of amplifier U3B or amplifier U3C, depending on which amplifier output signal is within the linear range. The selected output signal, after being converted to digital form, is analyzed to determine its phase relative to the phase of the signal which drives switch Q2 (and which is generated by the microprocessor U1.)

In one embodiment the resonant frequency of the transmit coil XMIT is e.g. 5 KHz, which also is the resonant frequency of the receive coil RCV, taken in conjunction with their associated capacitors C6 and C5. This resonant frequency is to be contrasted with the very brief period of the sampling pulses which control switch Q4. While the frequency of these sampling pulses is also 5 KHz, each of the sampling pulses has a period (duration), of e.g. 1 microsecond.

The short duration sampling pulse, coupled with the high speed performance of the microprocessor U1, allows generation of a nulling signal having the proper phase angle and level with a high degree of time resolution. Hence this results in a precision metal detector which adaptively nulls out any unwanted (false) signals.

Hence the microprocessor U1, upon determining the phase of the signal from the receive coil RCV, changes the relative position in time (phase) of the sampling signal which drives switch Q4, in order to find the phase of the zero amplitude point of the signal from the amplifiers U3B or U3C. Hence the sampling pulse position is swept in time (phase) over the available 200 microsecond window. (This is the period which corresponds to the 5 KHz resonant frequency). (Note that the microprocessor can sweep the phase of the square wave coupled to multiplier U4 relative to the control signals for switches Q2 and Q4 or vice versa.) Hence when the phase of the signal received by microprocessor U1 from amplifier U3A, as sampled by switch Q4, is exactly at the zero phase angle point relative to the receive signal.

Now that the microprocessor U1 has determined the phase of the receive signal, the microprocessor U1 generates a signal which is shifted 180° in phase (opposite in phase) to the phase angle of the receive coil RCV signal. This phase shifted signal is then coupled to one input terminal of the multiplier U4.

The sampling pulse applied to switch Q4 is then phase shifted 90° relative to the zero amplitude point to correspond to the position of the peak amplitude of the signal received from the receive coil RCV.

To complete the nulling function, the current level of the signal output by multiplier U4 is adjusted by microprocessor U1. Hence the PWM signal from microprocessor U1 provides a voltage controlled gain to the second terminal of multiplier U4. Hence while monitoring the output of the amplifiers U3B or U3C, the microprocessor U1 in response adjusts the duty cycle of this PWM signal which in turn varies the level of the nulling signal output by multiplier U4. Hence the output of multiplier (transconductance amplifier) U4 is dynamically adjusted (during the calibration process) so that, in the absence of a metal target, the output signal from receive coil RCV is canceled out by the nulling signal from amplifier U4, resulting in zero signal at summing node N.

It is to be understood that the nulling signal typically is not a sine wave, but is more of a sawtooth wave. However, since the receive signal is only sampled, what matters is the nulling signal at the sampling times, and that the sawtooth nulling signal is at the proper level at the sampling times.

FIG. 3A is a detailed schematic diagram showing the elements of FIG. 2 with other associated components and showing the various component designations and values. In one embodiment the microprocessor U1 is a microcontroller having an 8 bit internal bus and general purpose output ports, commercially supplied by Microchip, part number PIC16C73. A conventional crystal Y1 which resonates at e.g. 10 MHz is connected across the timing input terminals OSC1 and OSC2 of microprocessor U1.

In this embodiment two output devices are provided. One is the liquid crystal display part U2 which is shown having the conventional segment and other terminal designations. This is an eight segment LCD in which the segments are arranged, not to make a numeral, but in linear form. The LCD also includes in one embodiment an icon indicating whether the target is a ferrous metal. The second output device is a speaker SP1 which provides an audible indication.

Each of the amplifiers U3A, U3B and U3C has connected across it a resistor and capacitor to set its gain. The particular component values shown here of course are illustrative and not limiting. Also, as shown, an RC filter (resistor R1 and capacitor C5) filters the PWM signal provided by microprocessor 41 at terminal C2 to the base terminal of transistor Q1 which drives amplifier U4. A second RC filter (components R2, C4) filters the signal provided from terminal A2 of microprocessor U1 to drive amplifier U4. Switches Q2, Q4 are transistors in FIG. 3A.

Shown in the lower right portion of FIG. 3A are two user operated switches. The first switch is the audio switch SW3 which determines whether the speaker SP1 is active or not, and has only two positions, on or off. In other embodiments only an audio output is provided and there is no visual (LCD) output device, or only the LCD is provided.

The second switch SW2 is the mode switch. The mode switch has three positions here labeled S, Z and D corresponding to three operational modes available in one embodiment which are the scan, zoom, and depth modes. It is to be understood that these modes are only illustrative.

The scan mode is the "normal" mode for general purpose target locating. In certain embodiments the present metal detector has the primary application of detecting metal objects such as metal pipes and reinforcing bar (rebar) buried in concrete, but the present metal detector is not so limited. In the scan mode the visual display LCD U2 and a frequency modulated audio output signal from speaker SP1 indicate increasing signal intensity, i.e. the nearness of a metal target. The maximum signal is indicated when the metal detector is at its closest position to the metal target. In the scan mode the microprocessor U1 cycles between the low and high gain channels associated respectively with amplifiers U3B and U3C in order to cover the maximum dynamic signal range.

In use, there is an automatic calibration at power up of the metal detector in the absence of a metal target. During the calibration, the signal received from amplifiers U3B and U3C is designated a baseline signal and is regarded as a zero signal, i.e. indicating the absence of metal.

Subsequently if one wants to take a measurement in the scan mode, the metal detector is applied to the search area and if a signal is received from amplifiers U3B or U3C greater than that of the baseline signal, but is a relatively small signal, then only the first segment of the display is illuminated. If the signal is significantly higher, the first and second segments are illuminated and so on until at a maximum signal all eight LCD segments are illuminated. Hence a table is provided in the software installed in microprocessor U1 which maps the signal received at its terminals A0 and A1 into various display segments of LCD U2 in the scan mode.

The zoom mode increases the signal resolution when one has already located a metal target in the scan mode. For instance, there may be multiple targets close together which in the scan mode appear to be one wide target, i.e. several rebars located close together. The effect of the zoom mode is that of an "offset and gain" function where the zero point (the baseline signal) is redefined by a recalibration of the detector to be the existing signal and any small variations detected thereinafter (caused by the multiple targets) are accentuated by amplifying these small variations.

Hence in the zoom mode, after the target is located in the scan mode, the user turns off the power to the metal detector (see power switch SW1 in FIG. 3B), then places the detector at the location where the target was found in the scan mode, switches to zoom mode, and turns the metal detector back on. At this point a second calibration process is performed by microprocessor U1 so that the output indication is zero even though a metal target is present. Then the user slowly moves the metal detector over the area of the target and is provided with an indication (in the visual display U2 and/or the speaker SP1) of local intensity variations, allowing the user to distinguish several close together targets by use of a second look-up table in the microprocessor software.

The third mode is the depth mode which is conceptually the "reciprocal" of the scan mode. In the depth mode the display is calibrated to indicate the depth, for instance to the nearest inch, for a predetermined target such as a standard size rebar. Hence in this case there is prestored in the software in the microprocessor U1 a third table which has been factory calibrated for that particular metal detector for a predetermined type of target buried in concrete, for various depths. Hence in this case the number of display segments displayed indicates the depth in inches of the detected rebar.

FIGS. 3B and 3C are associated with FIG. 3A and show circuitry for generation of the voltages required by the metal detector of FIG. 3A. These voltages include the supply voltage VCC generated by a 9-volt battery B1 and a reference voltage VM for use by amplifiers U3B and U3C.

Figure 4:
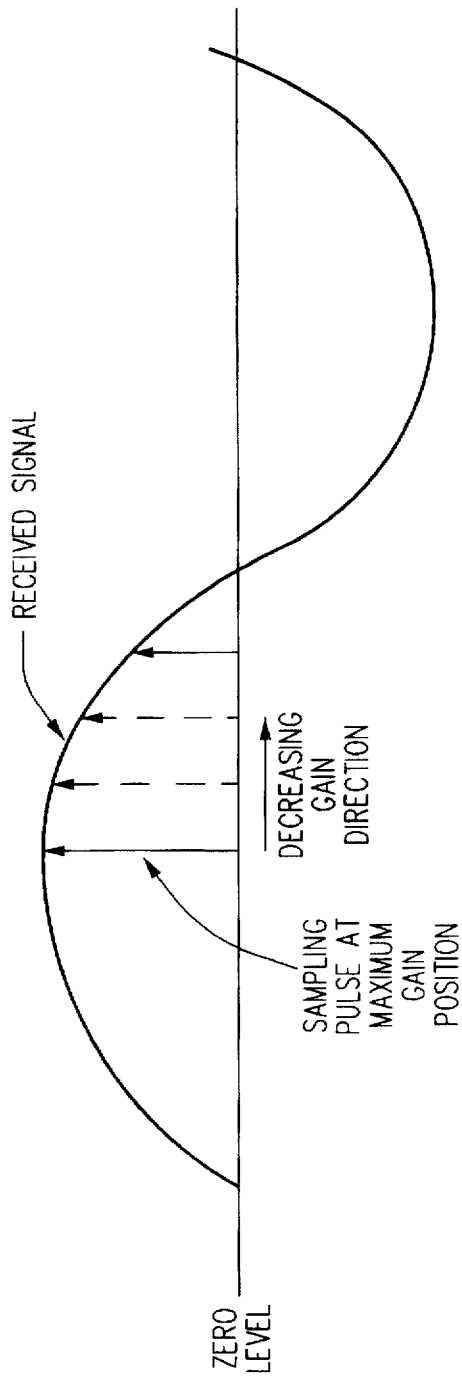
FIG. 4 shows diagrammatically part of the operation of the microprocessor controlling the metal detector of FIGS. 2 and 3A.

Also in accordance with the invention, attenuation of the output signal from receive coil RCV is provided. The amplitude of the signal output by amplifiers U3B and U3C varies approximately inversely to the cube of the depth of the target in the medium. Thus over a small depth range, the signal amplitude varies over a wide dynamic range. In accordance with the invention this wide dynamic range is accommodated by an automatic gain control attenuation. Rather than using variable gain amplifiers, instead in accordance with this invention the gain of this signal is varied in the software of the microprocessor U1 by "sliding" the position of the sampling pulse provided from terminal A4 of microprocessor U1 (which drives switch Q4) with respect to that of the received signal, as shown graphically in FIG. 4. Here the received signal from coil RCV is shown as a sine wave. Normally the sampling pulse (signal) applied to switch Q4 is located at the maximum amplitude position of the received signal, as described above. By moving this sampling pulse within its time window to a decreased gain position i.e. away from the peak of the received signal, the received signal amplitude, when sampled, is attenuated. Hence one can attenuate the metal detector gain (typically in the low gain mode) by changing the phase angle of the sampling pulse relative to the peak amplitude of the received signal. This is performed by the microprocessor software when the microprocessor U1 senses that the received signal is approaching saturation, i.e. is very high due to a very large and/or close target.

In order to accomplish the above described functionality, certain features are provided in the microprocessor software.

A description of these follows.

In one embodiment the microprocessor operates in both a foreground and background mode using timers for proper timing for control of the phase changes. As explained above, the phases of the transmit coil and receive coil are continually changing relative to one another, effectively sliding "back and forth" in time. Therefore in one embodiment, the microprocessor has a feature known as a capture compare timer. The signals from the microprocessor which drive switch Q4 and provide a square wave to multiplier U4 are generated by this capture compare timer in background mode. This timer is a special hardware feature provided in certain commercially available microprocessors and/or microcontrollers. The purpose of this timer is to make sure that the change of the phase for the "receive" part of the detector takes place at the correct time, even though the microprocessor is concurrently doing other processing, i.e. that relating to the timing for the transmit signal. Hence the capture compare timer counts down in the background and must be serviced, i.e. reset, before its timing expires (before it times out) until it is the proper time to deal with the receive coil signal timing in software (foreground mode).

In the meantime, in the foreground the software (the program resident in the microprocessor) performs the timing function for the transmit coil i.e. the signal which controls switch Q2.

In one version, where the crystal Y1 is operating at 10 MHz, and the two coils RCV, XMIT have resonant frequencies of 5 KHz, the frequency for the microprocessor instructions (program) is 2.5 MHz. In this case there are 500 microprocessor operating cycles per each 90° portion of a 5 KHz cycle. Within each of these 500 microprocessor cycles only a certain number, e.g. 200 microprocessor cycles are actually required to actually execute the software instructions taking place during that time. Therefore the background hardware timer must keep track of an additional number of cycles, in this case 300 microprocessor cycles, during which so called "no-ops" are performed repetitively, i.e. there is no microprocessor instruction activity, until the end of the 500 microprocessor cycles has timed out. It is to be understood that these 500 microprocessor cycles only cover one-quarter (90°) of a wave cycle, i.e. one-quarter of each 5 KHz cycle.

As is understood from the above description, the timing of the signal which drives switch Q2 is phase shifted relative to the signals provided to multiplier U4 and switch Q4 on the receive side. In one embodiment, the square wave output by microprocessor U1 to drive switch Q2 is a one-third duty cycle signal. Hence this duty cycle is somewhat longer than the one-quarter cycle within which the microprocessor operates. This difference in the length of the cycles (⅓ vs. ¼) allows the software to execute while avoiding program contention. Thus the transmit coil timing is on a one-quarter cycle basis while the receive coil timing is on a one-third cycle basis, so they only overlap every twelve cycles. This provides sufficient set up time to avoid contention.

The PWM signal, which is the second input to multiplier U4, is also synchronized to the receive signal. This advantageously eliminates any problems due to PWM ripple (after filtering) having any undesirable effect on the nulling signal.

This disclosure is illustrative and not limiting; further modifications will be apparent to one skilled in the art in the light of this disclosure and are intended to fall within the scope of the appended claims.

We claim:

1. A method of detecting presence of a metal body using a transmitter coil connected in an induction bridge with a receive coil, whereby in the absence of a metal body an output signal from the receive coil is zero, and in the presence of a metal body an output signal from the receive coil is shifted in phase angle from a phase of a signal applied to the transmit coil, the method comprising the steps of:

applying a periodically varying signal to the transmit coil;

sampling a resulting output signal from the receive coil in synchronization with the periodically varying signal;

determining a phase of a zero amplitude point of the sampled output signal;

generating a signal that is shifted by 180° in phase angle from a phase angle of the sampled output signal; and applying the generated signal to the receive coil, thereby nulling any imbalance in the inductive bridge.

2. The method of claim 1, further comprising the step of shifting a phase angle of the step of sampling by 90° from that of the zero amplitude point.

3. The method of claim 1, further comprising the step of controlling a level of the generated signal.

4. The method of claim 1, wherein the step of controlling includes pulse width modulating to voltage control the level of the generated signal.

5. The method of claim 1, further comprising the steps of:

measuring an amplitude of the output signal; and displaying an indication of the measured amplitude.

6. The method of claim 1, wherein the transmit coil is connected in parallel with a capacitor, and the periodically varying signal has a frequency equal to a resonant frequency of a circuit including the capacitor and the transmit coil.

7. The method of claim 1, wherein the step of sampling includes the steps of:

generating a sampling pulse initially in synchronization with the periodically varying signal; and sweeping a phase angle of the sampling pulse over a predetermined range.

8. The method of claim 1, wherein at least the step of applying the generated signal occurs upon a powering up of the transmit coil.

9. A metal detector apparatus including:

a receive coil a transmit coil;

a sampling switch connected to a terminal of the receive coil;

a processor connected to a control terminal of the sampling switch and operating the sampling switch in synchronization with a periodically varying signal applied to the transmit coil; wherein the processor determines a phase of a zero amplitude point of a sampled output signal from the sampling switch, generates a signal that is shifted by 180° in phase angle from a phase of the sampled output signal, and applies the generated signal to the receive coil.

10. The apparatus of claim 9, further comprising an amplifier connected between a terminal of the receive coil and the processor to receive the generated signal and transmit it to the receive coil.

11. The apparatus of claim 9, wherein the processor also applies a pulse width modulated signal to the amplifier.

12. The apparatus of claim 9, further comprising first and second amplifiers each connected in parallel between the switch and the processor, an output terminal of each of the first and second amplifiers being connected to the processor.

13. The apparatus of claim 9, each of the transmit and receive coils being connected in parallel with a capacitor, and wherein a frequency of the periodically varying signal applied to the transmit coil is equal to a resonant frequency of a combination of the transmit coil and its associated capacitor.

14. The apparatus of claim 9, wherein the processor generates a sampling pulse that is coupled to the control terminal of the sampling switch, and the processor sweeps a phase angle of the sampling pulse over a predetermined range.

* * * * *